United States Patent [19]

Umeha et al.

[11] Patent Number: 4,732,310
[45] Date of Patent: Mar. 22, 1988

[54] COMPOSITE CAMSHAFT AND METHOD OF MAKING THE SAME

[75] Inventors: Genkichi Umeha, Tokyo; Takasi Uda, Urawa; Shunsuke Takeguchi, Yono, all of Japan

[73] Assignee: Nippon Piston Ring Co., Ltd., Tokyo, Japan

[21] Appl. No.: 740,845
[22] PCT Filed: Mar. 23, 1984
[86] PCT No.: PCT/JP84/00127
 § 371 Date: May 17, 1985
 § 102(e) Date: May 17, 1985
[87] PCT Pub. No.: WO85/01556
 PCT Pub. Date: Apr. 11, 1985

[30] Foreign Application Priority Data

Sep. 28, 1983 [JP] Japan ................................. 58-179761

[51] Int. Cl.$^4$ ............................................. B23K 9/225
[52] U.S. Cl. ..................................... 228/135; 29/525; 228/168
[58] Field of Search ............... 228/168, 135, 136, 182, 228/154; 29/525

[56] References Cited

U.S. PATENT DOCUMENTS

4,265,388 5/1981 Takahashi et al. .................. 228/135

FOREIGN PATENT DOCUMENTS

54-85754 7/1980 Japan .................................... 228/168
0081559 4/1983 Japan .................................... 228/245

*Primary Examiner*—Nicholas P. Godici
*Assistant Examiner*—Karen Skillman
*Attorney, Agent, or Firm*—Birch, Stewart, Kolasch & Birch

[57] ABSTRACT

A composite camshaft is formed by brazing a journal to a shaft. After a brazing material is fitted into an annular groove formed on the center of the inner peripheral surface of a shaft-receiving bore in the journal, the journal is fitted onto the shaft and the brazing material is heated until it melts. The molten brazing material consequently completely fills a clearance between the inner peripheral of the shaft-receiving bore in the journal and the outer peripheral surface of the shaft, ensuring that the journal and the shaft are firmly connected.

6 Claims, 1 Drawing Figure

COMPOSITE CAMSHAFT AND METHOD OF MAKING THE SAME

TECHNICAL FIELD

The present invention relates to a composite camshaft for opening and closing suction and exhaust valves in an internal combustion engine and a method of making the same, and more particularly to improvements in a fitting member bonded to a shaft member by brazing.

BACKGROUND ART

A composite camshaft has a shaft and a plurality of fitting members such as cams and journals separately fabricated and fixedly mounted on the shaft. The journal is generally made of a sinterable alloy material or ordinary steel. The journal of sinterable alloy is diffusion-bonded to the shaft by a liquid-phase sintering, having no problem in connection with a binding strength between the journal and the shaft. On the other hand, the journal of ordinary steel is bonded to the shaft by brazing.

The brazing method has been disclosed by JP A No. 56-109908 and JP A No. 57-81953, having the steps of putting a brazing material on one side of the bore of the fitting member and melting it by heat. However, there is no assurance that the brazing material will reach the opposite side of the fitting member.

The present invention is intended to resolve the problem as described above and provide a composite camshaft and a method of making the same in which a journal is firmly bonded to a shaft by a brazing material which penetrates through a clearance between the journal and the shaft.

DISCLOSURE OF THE INVENTION

To attain the object described above, the present invention comprises a fitting member, such as a journal or the like, having a shaft-receiving bore for effecting a fitting engagement with a steel shaft. An annular groove is formed in the central portion of the bore for housing a brazing material. The brazing material is disposed in the annular groove before the fitting member is fitted on the shaft. With subsequent heating, the brazing material is melted to bond the fitting member with the shaft as one body.

In accordance with the present invention, the method of making the composite camshaft comprises the steps of forming an annular groove in the central portion of the shaft-receiving bore of the fitting member, disposing a brazing material in the annular groove before the fitting member is coupled with the steel shaft, and melting the brazing material by heat to bond the fitting member with the shaft. The brazing material easily flows from the annular groove into the narrow clearance between the shaft and the both sides of the bore of the fitting member, thereby ensuring a tight bondage between the fitting member and the shaft. Besides, the annular groove advantageously reduces the weight of the fitting member.

BEST MODE OF CARRYING OUT THE INVENTION

Figure 1:
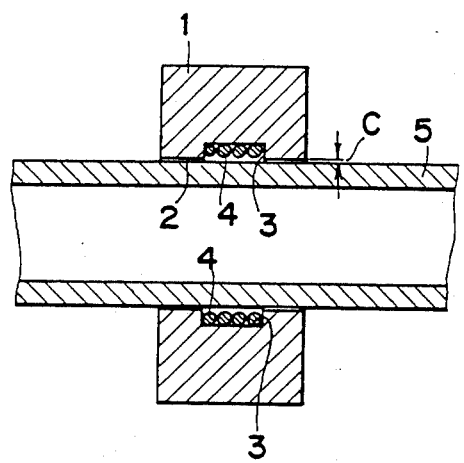
FIG. 1 is a section of the camshaft according to the present invention, illustrating the assembly just before the step of heating.

The present invention will be described in detail below with reference to drawings which illustrate only one specific embodiment. The journal 1 of steel has its shaft-receiving bore 2 formed with an annular groove 3. The annular groove 3 is located in the central portion of the inner surface of the shaft-receiving bore 2. A cylindrical or helical brazing material 4 of pure copper is mounted in the annular groove 3. The brazing material 4 preferably has a diameter larger than that of the annular groove so as to extend along the bottom of the annular groove. The brazing material 4 is melted to fill the clearance between the shaft 5 and the shaft-receiving bore 2. The brazing material is preferably determined to have a volume of about one and one-half times larger than that of the clearance.

After the brazing material 4 is fitted in the annular groove 3, the shaft 5 of a steel pipe is inserted into the shaft-receiving bore 2 in the journal 1. There is a clearance C of about 0.1 mm between the inner surface of the shaft-receiving bore 2 in the journal 1 and the outer surface of the shaft 5, so that the journal is temporarily fixed to the shaft when coupled with each other.

After the journal 1 is temporarily fixed to the shaft 5, the assembly is heated at 1120° C. for 90 minutes in a decomposed ammonium gas atmosphere to melt the brazing material. The melted brazing material 4 flows into the clearance C between the shaft-receiving bore 2 and the shaft 5 from the annular groove to make a firm bondage therebetween. The shaft and the journal are tightly bonded to have the strength of a unitary body. In a shearing test by Universal Material Tester with a pressure rate of 3 mm/min, the bonding strength cleared a shearing stress of 25 Kg/sq. mm. This ensures that the inventive camshaft is of practical use.

We claim:

1. A composite camshaft comprising a fitting member provided with a shaft-receiving bore and mounted on a shaft with a clearance therebetween and bonded to said shaft by a brazing material, wherein said fitting member is formed with an annular groove disposed in the central portion of the inner surface of said shaft-receiving bore, said annular groove containing said brazing material, which upon heating, melts to fill the clearance and bond the fitting member with the shaft as a unitary body, said brazing material being larger in diameter than said annular groove so as to extend along the bottom of said annular groove.

2. A method of making a composite camshaft having a fitting member provided with a shaft-receiving bore to be mounted on a shaft and bonded to said shaft by a brazing material which comprises the steps of forming an annular groove in the central portion of the inner surface of said shaft-receiving bore,
disposing said brazing material in said annular groove in a manner that said brazing material is larger in diameter than said annular groove so as to extend along the bottom of said annular groove,
inserting said shaft into said shaft-receiving bore to mount said fitting member on said shaft with a clearance therebetween, and
melting said brazing material by heat to fill the clearance and bond said fitting member to said shaft as a unitary body.

3. The method of claim 2 wherein the composite is heated at a temperature of 1120° C. for 90 minutes in a decomposed ammonium gas atmosphere.

4. The composite camshaft of claim 1 wherein a clearance of 0.1 mm in disposed between the inner surface of the shaft receiving bore and the outer surface of the shaft.

5. The composite camshaft of claim 1 wherein the groove is a rectangular groove.

6. The composite camshaft of claim 1 wherein a clearance is provided between the fitting member and the shaft and the volume of the brazing material in the annular groove is about 1½ times larger than the volume of said clearance.

* * * * *